United States Patent [19]

Sagawa

[11] Patent Number: 4,631,084

[45] Date of Patent: Dec. 23, 1986

[54] HEAT-SENSITIVE COMPOSITION AND IMAGING SHEET INCORPORATING SAME

[75] Inventor: Burt K. Sagawa, Bloomington, Minn.

[73] Assignee: Minnesota Mining and Manufacturing Company, St. Paul, Minn.

[21] Appl. No.: 731,932

[22] Filed: May 8, 1985

Related U.S. Application Data

[62] Division of Ser. No. 458,323, Jan. 17, 1983, Pat. No. 4,531,141.

[51] Int. Cl.[4] .............................................. C09D 11/00

[52] U.S. Cl. ...................................... 106/21; 346/211; 346/212; 346/216; 346/217; 346/225; 427/150; 428/913

[58] Field of Search .................. 106/21; 346/208, 209, 346/211, 217, 225, 212, 216; 427/150–153; 428/320.4, 320.6, 320.8, 411, 488, 537, 913, 914

[56] References Cited

U.S. PATENT DOCUMENTS

| | | | |
|---|---|---|---|
| 2,663,654 | 12/1953 | Miller et al. | 117/36 |
| 3,157,526 | 11/1964 | Johnson et al. | 117/36.8 |
| 3,829,401 | 8/1974 | Futaki et al. | 260/38 |
| 3,846,153 | 11/1974 | Futaki et al. | 117/36.9 |
| 3,937,864 | 2/1976 | Kohmura et al. | 428/411 |
| 3,953,659 | 4/1976 | Truitt | 428/511 |
| 4,372,582 | 2/1983 | Geisler | 106/21 |

FOREIGN PATENT DOCUMENTS

| | | |
|---|---|---|
| 2344562 | 3/1974 | Fed. Rep. of Germany . |
| 57-014096 | 1/1982 | Japan . |
| 57-116689 | 7/1982 | Japan . |

*Primary Examiner*—Amelia B. Yarbrough
*Attorney, Agent, or Firm*—Donald M. Sell; James A. Smith; David L. Weinstein

[57] ABSTRACT

Heat-sensitive composition containing (1) at least two reactants which at normal room temperature do not react with each other, but which, upon application of thermal energy, undergo a chemical change which results in change of color, and (2) a non-complexing phenolic compound which enhances the color forming reaction. This composition can be applied to a substrate, such as, for example, paper or film, in order to form a heat-sensitive imaging sheet.

6 Claims, No Drawings

HEAT-SENSITIVE COMPOSITION AND IMAGING SHEET INCORPORATING SAME

This is a division of application Ser. No. 458,323 filed Jan. 17, 1983, now U.S. Pat. No. 4,531,141.

BACKGROUND OF THE INVENTION

1. Field of the Invention

This invention relates to heat-sensitive compositions and thermographic sheet material produced therefrom, and is particularly directed to compositions useful for producing thermally sensitive papers and films for use with thermal printing devices.

2. Description of the Prior Art

For many years, heat-sensitive imaging sheets have been used for copying papers, thermal print papers, recording papers, and labeling papers. Futaki, et al, U.S. Pat. No. 3,829,401 discloses a heat sensitive recording composition which comprises (1) a colorless or light-colored color forming compound selected from the group consisting of leuco lactone and spiropyran compounds, (2) a phenol compound capable of causing color formation of said color forming compound upon heating, and (3) a three-dimensionally cross-linked phenol resin which is a condensation reaction product of at least one lower aliphatic aldehyde, lower aliphatic aldehyde producing agent or a lower alkyl vinyl ether and a phenol compound having at least 3 ortho positions or para positions or ortho and para positions to the phenolic hydroxyl group free of substituents.

Futaki, et al, U.S. Pat. No. 3,846,153 discloses a thermal recording sheet containing the phenol compound having the formula

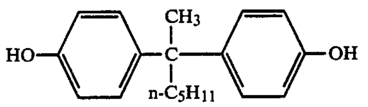

at least one colorless or light-colored lactone compound capable of reacting with said phenol compound upon heating to form a color, and a binder.

Truitt, U.S. Pat. No. 3,953,659 discloses a heat-sensitive print sheet comprising a thin flexible sheet material and including a heat-sensitive layer comprising:

a. a heat sensitive color producing formulation including a normally solid iron salt of a fatty acid and a diphenolic compound;

b. a binder comprising cellulose acetate;

c. acetone as a solvent for the binder; and d. water as a non-solvent blush material for the binder.

One type of heat-sensitive recording paper in wide use is generally referred to as a ferric-phenolic system. Such a recording paper generally comprises a paper sheet bearing a layer containing (1) a ferric salt of an organic acid, and (2) a phenol which reacts with the ferric salt to form a visible image when the paper is heated. Miller, et al, U.S. Pat. No. 2,663,654 describes heat-sensitive systems of the ferric-phenolic type.

Because of the improvement in thermal printing devices, a need has arisen to provide heat-sensitive recording sheets of higher speed and better quality. By higher speed, it is meant that the image appears more rapidly upon application of heat. By better quality, it is meant that the image exhibits greater stability and better resolution. Dye-based heat-sensitive imaging sheets, such as those described in U.S. Pat. Nos. 3,829,401 and 3,846,153, exhibit rapid thermal response, good resolution, and good contrast. However, the images produced tend to fade when exposed to ultraviolet radiation, and the imaging sheets are very susceptible to chemical attack. Contact with hand lotion, grease, alcohol, or adhesive on transparent tapes can readily obliterate the image. Accordingly, it is still desirable to employ a conventional ferric-phenolic system for heat-sensitive recording sheets because this system exhibits exceptional permanence, i.e. good stability, and good resistance to most common chemicals and ultraviolet radiation. In addition, ferric-phenolic thermal imaging systems are capable of providing black images at low cost. Although dye-based thermal imaging systems are capable of providing black images, the cost of a conventional dye-based system is quite often significantly higher than the cost of a conventional ferric-phenolic system.

SUMMARY OF THE INVENTION

This invention involves a heat-sensitive imaging composition containing a phenolic compound which enhances the reaction between the image forming components of the composition. The inclusion of the reaction-enhancing phenolic compound noticeably increases the rate of reaction between the image forming components. The increase is noted by the fact that the reaction between the image forming components in the composition containing the reaction-enhancing phenolic compound approaches completion at a lower temperature than would be expected in a composition identical in all respects except for the absence of the phenolic compound.

The preferred thermal imaging compositions are those wherein the inter-reactive image forming components comprise (a) a ferric salt of an organic acid, and (b) a phenolic compound which forms a complex with the ferric ion of the ferric salt upon application of heat, i.e. thermal energy, to the compositions. The reaction enhancing phenolic compound is one which does not form a permanent, colored complex with the ferric ion of the ferric salt. A preferred reaction-enhancing, i.e. non-complexing, phenolic compound is 4,4,'-isopropylidenediphenol (Bisphenol A).

DETAILED DESCRIPTION

The image forming components of the heat-sensitive compositions comprise at least two solid reactants which are potentially chemically capable of irreversibly and rapidly reacting at normal room temperature to produce a visibly different reaction product, but which are normally physically prevented from so reacting. The system containing the image forming components is so designed that an increase in temperature to a predetermined level allows the reaction to take place. The application of thermal energy results in an immediate reaction of the reactants and formation of a colored, opaque, or otherwise visibly different reaction product.

The rapid rate of reaction obtainable by this means is particularly advantageous where the reactive material in sheet form is to be used as a heat-sensitive imaging paper. For the most effective printing, recording or the like containing fine lines as well as massive dark areas, a high contrast value must be obtained when the sheet is heated from room temperature (25° C.) to a temperature as high as 400° C. within a period of time not in excess of 25 milliseconds, and preferably between about 1 and 5 milliseconds. As used in this application, the term "contrast value" means the difference between the optical density of the image area and the optical density of the background area. A high "contrast value" is one in which the optical density of the image area exceeds the optical density of the background area by at least 0.4 optical density units.

A convenient method of determining the rate of reaction as well as the required temperature of activation for a particular thermally sensitive paper involves contacting a strip of the paper against a metal bar, the temperature of which increases constantly at the rate of 13.5° per cm along its length from a low of 70° C. to a high of 205° C., for a period of 25 milliseconds, under a pressure of 30 psi.

The preferred sheets, when so tested, show a reaction from the original state to a color intensity or opacity equivalent to a contrast value of at least about 0.4 and preferably about 0.9, as measured by a MacBeth Model RD514 densitometer, when heated to the required temperature level. The reactive components in the heat-sensitive imaging sheet are stable at temperatures less than about 60° C. but are rapidly and visibly inter-reacted when the imaging sheet is heated to 120° C.

The preferred image forming components of the heat-sensitive compositions are (a) a ferric salt of an organic acid and (b) a phenolic compound which forms a colored complex with the ferric ion of the ferric salt upon application of heat to the compositions. The reactive solid components, and the reaction enhancing phenolic composition, which will be fully described hereinafter, can be conveniently applied to paper or other substrates as a dispersion in a solution of a bonding agent, i.e. a binder, in a suitable volatile vehicle.

As used in this application, the term "complex" means a heterocyclic ring associated with a metal ion, the metal being attached by coordinate links to two or more non-metal atoms in the same molecule. The term "non-complexing compound" means a compound which is not capable of forming a permanent, colored complex with a metal ion. Although "non-complexing compound" may be able to form a temporary complex with a metal ion of a metal salt under certain conditions, e.g. heating, upon return to ambient conditions the complex will break down into the original metal salt and non-complexing compound.

In general, the ferric salts suitable for this invention can be represented by the general formula:

$$(RCOO)_3Fe$$

wherein R is an aliphatic or alicyclic radical containing 6 to 21 carbon atoms.

The acid portion can be derived from naturally occurring long-chain monocarboxylic saturated and unsaturated fatty acids with 7 to 22 carbon atoms, rosin acids, tall oil, naphthenic acids, 2-ethylhexoic acid, and synthetic tertiary acids. Examples of ferric salts which are suitable include ferric stearate, ferric myristate, ferric palmitate, ferric behenate, and mixtures thereof. In general, ferric salts which soften or melt at temperatures within the range of about 60°-120° C. are useful in the thermal imaging compositions of this invention.

The phenolic compound component of the heat-sensitive composition which is capable of forming a colored complex with the ferric ion of the ferric salt are selected from those compounds having hydroxyl groups in adjacent positions of an aromatic ring of a monocyclic or polycyclic aromatic compound, i.e., those compounds having hydroxyl groups ortho to each other. Examples of phenolic compounds suitable as an image-forming component of the heat-sensitive composition include gallic acid, methyl gallate, ethyl gallate, propyl gallate, butyl gallate, dodecyl gallate, lauryl gallate; tauric acid; pyrogallic acid; azeloyl pyrogallol, sebacoyl pyrogallol, oxaloyl pyrogallol, diiminoylbis-pyrogallol, 2,4,5-trihydroxybutyrophenone, catechol, t-butyl catechol, 3,5-di-t-butyl catechol, 4-t-octylcatechol, 4,5-dichlorocatechol, 3-methoxycatechol, o-protocatechuic acid, pyrocatechuic acid, 4,4'-isopropylidene dicatechol, catechin, 3,4-dihydroxytetraphenylmethane, 2,3-dihydroxynaphthalene, 2,3-dihydroxybenzoic acid, 3,4-dihydroxybenzoic acid, 1,1'-spiro-bi(5,6-dihydroxy-3,3-dimethyl- 1,2- dihydroindene), 1,1'-spiro-bi(5,6,7-trihydroxy-3,3-dimethyl-1,2-dihydroindene), 1,1'-spirobi(4,5,6-trihydroxy-3,3-dimethyl-1,2- dihydroindene).

Combinations of solid visibly inter-reactive materials which have provided effective heat-sensitive papers when coated on various paper or film backings in the form of dispersions in solutions of film-forming binders include ferric stearate-gallic acid, ferric stearatepyrogallic acid, ferric stearate-triethyl sulfonium tannate; ferric stearate-cadmium tannate; and ferric stearate-ammonium salicylate.

The visible change obtained on activation of the heat-sensitive material is the result of a combination between the iron of the ferric stearate, or equivalent, and the phenolic portion of pyrogallic or gallic acid, tannates, salicylates, or the like.

The ferric-phenolic heat-sensitive compositions encompassed by this invention each comprise at least two solid heat-sensitive components which when placed in sufficiently intimate contact, as for example by dissolution of one or both of the components in a suitable solvent, are capable even at normal room temperature of producing an intense color or some other visible manifestation of chemical reaction. A bonding agent for conveniently supporting and bonding the reactive components is included; such a binder, or at least some reactive component thereof, may itself serve as one of the color-producing reactants. Binders suitable for ferric-phenolic heat-sensitive imaging compositions include vinyl resins, acrylic resins, styrene resins, cellulose resins, polyester resins, urethanes, alkyl resins, silicones, epoxy resins, and gelatin.

In addition to ferric-phenolic systems it has been found that other thermal imaging compositions are included within the scope of this invention. For example, U.S. Pat. No. 3,157,526 discloses a thermal imaging system comprising a uniformly dispersed mixture of at least one zinc salt selected from zinc lower alkyl di-substituted di-thiocarbamates (the substituted radicals of which have from one to five carbon atoms) and zinc aryl di-substituted di-thiocarbamates, and at least one heavy metal salt of a higher fatty acid which is non-reactive with the zinc salt at normal room and storage temperature and reactive with the zinc salt at temperatures above the melting point of the zinc salt to produce a color change. Where the heat-sensitive material is desired to be present as a layer on one side of a sheet of base material, the heat-sensitive material is preferably incorporated into a film former or binder and then applied to the base material as a surface coating.

Although several classes of thermal imaging compositions are within the scope of the present invention, ferric-phenolic systems are preferred, and, for that reason, the discussion to follow will be oriented toward that type of thermal imaging system.

It has been discovered that incorporation of certain classes of non-complexing phenolic compounds into the heat-sensitive compositions of the types previously mentioned, i.e. ferric-phenolic systems, zinc salt-heavy metal salt systems, increases the reaction rate of the color forming reaction, and is believed to cause the reaction to go to completion. The non-complexing phenolic compounds do not form permanent, colored, solid complexes with the ferric ion nor do they enter into the color-forming reaction in the zinc dithiocarbamate thermal imaging system. The non-complexing phenolic compound may, however, form a temporary and/or non-colored complex with a metal ion. For example, Bisphenol A, a non-complexing phenolic compound, forms a medium blue-gray temporary complex when heated with ferric stearate to about 98° C., the melting point of ferric stearate. However, upon cooling to room temperature, about 25° C., and resolidifying, the gray color disappears and the reddish-orange color of ferric stearate remains, thus indicating the breakdown of the temporary complex. In solution, e.g. in a solvent comprising acetone and/or xylene, dissolved ferric stearate forms a temporary brown/black complex with Bisphenol A. However, ferric stearate and Bisphenol A will not form a permanent, colored, solid complex. Other phenolic compounds that have characteristics similar to Bisphenol A with respect to ferric stearate, i.e. upon solidification or resolidification, they will not form a permanent complex with ferric ion, are considered for the purposes of this application to be "non-complexing phenolic compounds." Non-complexing phenolic compounds which are suitable for inclusion in the thermal imaging systems previously described include those in the following classes:

(1) Monophenols
(2) Bisphenols
(3) Polyphenols containing more than two phenolic groups The term "monophenol", as used in this application, means a phenolic compound containing one, and only one, hydroxybenzene ring. The monophenols include the monohydroxy phenols, e.g. phenol, the dihydroxy phenols, e.g. hydroquinone, and the trihydroxy phenols, e.g. 1,3,5-trihydroxybenzene. With respect to the dihydroxy phenols and trihydroxy phenols, only those phenols without hydroxyl groups in adjacent positions on any aromatic ring of a monocyclic or polycyclic aromatic compound are suitable as the non-complexing phenolic compound. Stated another way, the non-complexing phenolic compounds must not have hydroxyl groups ortho to each other. Phenolic compounds having hydroxyl groups in adjacent positions of an aromatic ring are not suitable because they will form a permanent colored complex with iron.

The monophenols may be represented by the general formula:

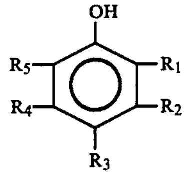

wherein $R_1$ and $R_5$ are independently hydrogen, an aryl radical, or an alkyl radical of 1 to 6 carbon atoms, $R_2$, $R_3$, and $R_4$ are independently hydrogen, —OH, an aryl radical, or an alkyl radical of 1 to 6 carbon atoms, provided that $R_3$ cannot be —OH if either $R_2$ or $R_4$ is —OH, or if both $R_2$ and $R_4$ are —OH.

The term "bisphenol", as used in this application, means a phenolic compound containing of two, and only two, hydroxybenzene rings, said rings being linked by bridging groups selected from alkylene groups having 1 to 4 carbon atoms, thio groups, carbonyl groups or sulfonyl groups. The hydroxybenzene rings are linked through the ortho or para position. Bisphenols are also commonly referred to as diphenols.

The term "polyphenol", as used in this application, means a phenolic compound containing three or more hydroxybenzene rings. The hydroxybenzene rings of polyphenols suitable for this invention may be linked in repeated matter, with bridging groups linking the rings. Such bridging groups can be selected from alkylene group having 1 to 4 carbon atoms, thio groups, carbonyl groups or sulfonyl groups. Alternatively, the hydroxybenzene rings may be linked to a nucleus. An example of a polyphenol wherein the hydroxybenzene rings are linked to a nucleus is represented by the following formula:

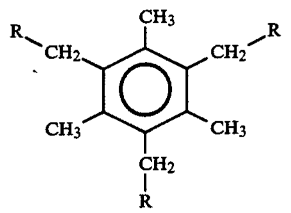

wherein

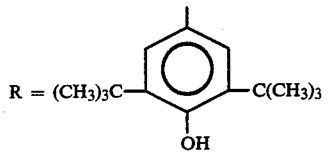

With respect to bisphenols and polyphenols, any one or more of the hydroxybenzene rings can contain more than one hydroxyl group; however, only those compounds having hydroxybenzene rings wherein the hydroxyl groups are not adjacent to each other, i.e. not ortho to each other, on the hydroxybenzene rings are suitable as non-complexing phenolic compounds.

Monophenols which are suitable for use in the present invention include the following:

4-tert-butylphenol
3-methyl-6-tert-butylphenol
4-methyl-2-tert-butylphenol
2-phenylphenol 4-phenylphenol
2,4-dimethyl-6-tert-butylphenol
2,4-di-tert-butylphenol
2,6-di-tert-butylphenol
4-methyl-2,6-di-tert-butylphenol phenol Bisphenols which are suitable include the following:
4,4'-thiodiphenol
4,4'-sulfonyldiphenol
4,4'-isopropylidenediphenol (Bisphenol A)
4,4'-thiobis(3-methyl-6-tert-butylphenol)
p,p'-sec-butylidenediphenol
2,2'-methylenebis(4-methyl-6-tert-butylphenol)
4,4'-methylenebis(2,6-di-tert-butylphenol)

Polyphenols which are suitable include the following:
1,3,5-trimethyl-2,4,6-tris(3,5-di-tert-butyl-4-hydroxybenzyl)benzene
1,3,5-tris(4-tert-butyl-3-hydroxy-2,6-dimethyl benzyl)-1,3,5-triazine-2,4,6-(1H,3H,5H)-trione In some types of thermal imaging compositions, plasticizers or "solid solvents" which melt at temperatures of or lower than the melting point of the reactive image-forming components will cause the reaction rate to increase. The use of these plasticizers is well known in the art. Although some of the non-solid complex-forming phenolic compounds that are capable of forming permanent complexes have melting points lower than the reaction temperature of the metal ion-complexing agent compositions, others have relatively high melting points, thus indicating that plasticizing or solvating is not the cause of the increased thermal reaction rate.

It has been found that the molar ratio of non-complexing phenolic compound to complexing phenolic compound may range from about 1:20 to about 1:0.1 with the preferred range being from 1:10 to 1:1. The greater the amount of non-complexing phenolic compound that can be introduced into the ferric-phenolic system, the more rapid and complete is the thermal imaging reaction.

In ferric-phenolic thermal imaging systems, the phenolic compound that reacts with the ferric ion upon application of heat to form the image is relatively expensive. Accordingly, it would be desirable to reduce the concentration of the complexing phenolic compound while still retaining acceptable reaction speed and image quality. The addition of an appropriate non-complexing phenolic compound to the ferric-phenolic thermal imaging system allows the concentration of the expensive complexing phenolic compound to be reduced.

The complexing phenolic compound and ferric salt of the organic acid can be present in the heat-sensitive compositions in stoichiometrical amounts, or, preferably with an excess of the metal salt. The excess of metal salt insures color change of the phenolic compound. Although less preferred, the molar concentration of complexing phenolic compound can exceed that of the metal salt. Likewise, the zinc di-substituted di-thiocarbamate and heavy metal salt of long chain fatty acid color forming agents, as disclosed in U.S. Pat. No. 3,157,526, can be present in the heat-sensitive compositions in stoichiometrical amounts, or, preferably, with an excess of the heavy metal fatty acid salt. Although less preferred, the molar concentration zinc di-substituted di-thiocarbamate can exceed that of the heavy metal salt.

The reactive solid components and the non-complexing phenolic compound, either individually or as a preformed mixture, can be conveniently applied to paper or other substrate, e.g. polymeric films, metal foils, as a dispersion in a solution of a bonding agent in a suitable volatile vehicle, such as water or a common organic solvent, e.g., acetone, alcohol. The bonding agent assists in retaining the reactants and the non-complexing phenolic compound on the surface of the substrate. However, other methods of applying the components of the heat-sensitive compositions to the substrate and of maintaining them in proper relationship thereon may alternatively be employed. For example, a polymerizable monomer may be substituted for the solution of bonding agent; after application, the monomer may be polymerized in situ to form a binder film. The reactive solid components and the non-complexing phenolic compound may be dispersed within, or on the surface of, a fibrous web or other substrate in the substantial absence of any added bonding agent. Additionally, the use of a film-forming bonding agent, such as, for example, polyvinyl butyral or ethylcellulose as a self-supporting film as well as a binder and carrier for the ingredients of the composition is also contemplated. In this type of product, the film-forming composition containing the color-producing reactants and non-complexing phenol may be coated on a paper or film sheet and dried to provide an exceedingly thin sheet. Film-forming compositions employing a reactant or reactants which are themselves film-forming, or which have adequate adhesion to a supporting web, ordinarily require no auxiliary bonding or film-forming agent.

Certain advantageous results may be obtained by proper selection and proportioning of the bonding agent as well as the components of the heat-sensitive composition, and in the preferred compositions, use of a suitable inert bonding agent or combination of bonding agents in significant proportions is contemplated. The degree of contrast obtainable with the paper prepared with the thermal imaging compositions of this invention can be readily controlled, for example, by suitably proportioning the relative amounts of binder and of reactants.

Changes in the particle size and shape of any one or all of the reactant materials and/or non-complexing phenolic compound, and in the relative amounts of the individual components, can also have some effect on the results obtained.

Where desired, various inert materials, such as, for example, pigments or the like, may be added to the compositions of the invention. Additional surface coatings, e.g. of film-forming materials, may be applied as protective layers, or to impart desirable color, or for other purposes.

The particular characteristics of the base sheet or substrate are not deemed to be critical. Base papers suitable for bearing the coating composition of this invention include commercially available cellulosic paper, synthetic nonwoven paper and the like. Other base sheet materials that are suitable include polymeric materials, such as polyesters. A commercially available polyester is polyethylene terephthalate (Mylar ®, available from E. I. duPont de Nemours and Co.). The base sheet is preferably of uniform density, uniform whiteness, and of a thickness ranging about 2 to about 10 mils.

A typical heat-sensitive imaqing composition can be prepared by the following procedure:

Reactant A 7.1 parts commercial ferric tristearate, 1.8 parts titanium dioxide, 0.5 part stearamide, 4.4 parts cellulose acetate are dispersed in a solvent comprised of 77.5 parts acetone and 9.0 parts xylene by grinding in a ball mill, sand mill, attritor mill, or the like. The function of the titanium dioxide is to lighten the color of the sheet to which the composition will be applied. Stearamide is a solid lubricant and reaction temperature controlling agent.

Reactant B

From about 0.45 to about 3.0 parts methyl gallate, the complexing phenolic compound, is dissolved in 23.1 parts acetone.

Non-Complexing Phenolic Compound

From about 0.75 to about 2.5 parts Bisphenol A, the non-complexing phenolic compound, is dissolved in 28.5 parts acetone.

In order to prepare the heat-sensitive composition, the solution of Reactant B and the solution of non-complexing phenolic compound is added to the dispersion of Reactant A.

In mixing and temporarily maintaining the mixture of the ingredients of the heat-sensitive composition in a volatile vehicle such as acetone, a slight discoloration may sometimes be noted. This is presumably due to solution of traces of one or both of the substantially insoluble reactants in the liquid vehicle and the resultant reaction of the dissolved materials to produce a dark-colored reaction product. The presence of a trace of oxalic acid, which forms a complex with iron and consequently may be considered to render inaccessible any dissolved or previously reacted iron, discharges and/or prevents the formation of the slight discoloration thus otherwise produced. Citric acid, which likewise forms an iron complex, is also effective. In many cases the discoloration produced, even in the absence of these modifying reactants, is so slight as not to be troublesome, particularly where adequate precautions are taken in preparing and in applying the heat-sensitive composition.

The heat-sensitive composition can be coated on a suitable substrate by means of techniques well known in the art, such as, for example, flat bed knife coating, Meyer bar coating, airknife coating, extrusion coating, roll coating, and the like. The wet coating may be dried at room temperature or in a forced air oven at about 30° C. The dry coating weight can range from about 2.0 to about 7.0 g/$m^2$.

An alternative manner of applying the heat-sensitive compositions involves a two-trip coating process, wherein the solution of non-complexing phenolic compound is first added to either the dispersion of Reactant A or to the solution of Reactant B. Then, the substrate can be coated first with the dispersion containing Reactant A and then with the solution containing Reactant B, or vice versa.

The resulting coated sheet product rapidly darkens when heated to about 80° C., and is suitable for use as a heat-sensitive recording sheet or thermal print medium.

The invention is further illustrated by the following examples of specific heat-sensitive compositions. It is to be understood, however, that these examples are illustrative only and not intended to limit the scope of the invention.

EXAMPLE I

This example demonstrates the effect of different non-complexing phenolic compounds on different ferric-phenolic thermal imaging systems.

The following non-complexing phenolic compounds were employed:

(1) Bisphenol A, mp 153°-156° C.
(2) 2,6 di-t-butyl-4-methyl phenol (Ionol®, Shell Chemical Co.), mp 69°-70° C.
(3) 2,2'-methylene bis(6-t-butyl-4-methyl phenol) (Cyanox® 425, American Cyanamid), mp 125°-130° C.

The following ferric-phenolic thermal imaging systems were employed:

(1) Ferric tristearate:methyl gallate
(2) Ferric tristearate:1,1'-spiro bi(5,6,7-trihydroxy-3,3-dimethyl-1,2-trihydroindene)
(3) Ferric tristearate:3,4-dihydroxynaphthalene
(4) Ferric tristearate:1,1'-spiro bi(5,6-dihydroxy-3,3-dimethyl-1,2-dihydroindene)

The following method was employed to prepare the thermal imaging paper for each run:

1. A dispersion of the following ingredients, in the amounts indicated, was prepared by ball milling:

| Ingredient | Amount (Parts by Weight) |
|---|---|
| Ferric tristearate | 7.1 |
| Titanium dioxide | 1.8 |
| Stearamide (Kemamide ® S, Humko Chemical Co.) | 0.5 |
| Cellulose acetate (Eastman Chemical) | 4.4 |
| Acetone | 77.5 |
| Xylene | 9.0 |
| Phthalocyanine Blue pigment | 0.0006 |

2. A solution of the phenolic complexing agent was prepared by dissolving the particular agent in acetone.
3. A solution of the non-complexing phenolic compound was prepared by dissolving the particular compound in acetone.
4. The appropriate amount of solution of phenolic complexing agent and the appropriate amount of solution of non-complexing phenolic compound were added to the dispersion containing the ferric stearate prior to coating. Table I shows the amount of each key ingredient, i.e. ferric stearate, phenolic complexing agent, and non-complexing phenolic compound, in grams, for the composition for each run.
5. The compositions to be tested were coated on one surface of a paper substrate by means of a knife coater to a wet thickness of approximately 2 mils, i.e. a coating weight of approximately 0.45 g/$ft^2$, and allowed to dry at room temperature.
6. Coated strips of paper bearing the thermal imaging composition were imaged by contacting the strip with a heated platen having a continuous temperature change from 70° C. to 205° C., for 25 milliseconds, under a pressure of 30 psi.

The following parameters were measured:

A. $D_{max}$: Optical Density of image where platen temperature=205° C.
B. $C_{145°}$ : Contrast value at 145° C.[(Optical density of image where platen temperature=145° C.)—(Optical density of sheet background at normal room temperature)]

C. $\gamma$: Slope of curve of Optical Density (OD) v. Platen Temperature (T) $D_{max}$ and $C_{145^\circ}$ were measured with a MacBeth RD514 densitometer. $\gamma$ was calculated by the following formula:

$$\gamma = \frac{OD_{0.7} - OD_{0.1}}{T_{0.7} - T_{0.1}}$$

where $OD_{0.7} = 0.7 \times (D_{max} - D_{min}) + D_{min}$, $OD_{0.1} = 0.1 \times (D_{max} - D_{min}) + D_{min}$, $T_{0.7}$ = Temperature (°C.) where $OD_{0.7}$ occurs, $T_{0.1}$ = Temperature (°C.) where $OD_{0.1}$ occurs, $D_{min}$ = Background optical density of sheet, and $D_{max}$ is as defined as above.

The results are shown in Table I.

TABLE I

| Run | Amount of ferric stearate (g) | Phenolic complexing agent[1] | Amount of phenolic complexing agent (g) | Non-complexing phenolic compound[2] | Amount of non-complexing phenolic compound (g) | $D_{max}$ | $C_{145^\circ C.}$ | $\gamma \times 1000$ |
|---|---|---|---|---|---|---|---|---|
| 1 | 0.71 | A | 0.09 | None | .000 | 1.04 | 0.54 | 20.58 |
| 2 | 0.71 | A | 0.09 | E | .075 | 1.06 | 0.76 | 21.97 |
| 3 | 0.71 | A | 0.09 | E | .15 | 1.06 | 0.80 | 22.92 |
| 4 | 0.71 | A | 0.09 | F | .075 | 1.02 | 0.65 | 21.67 |
| 5 | 0.71 | A | 0.09 | F | .15 | 1.01 | 0.69 | 21.49 |
| 6 | 0.71 | A | 0.09 | G | .075 | 1.03 | 0.63 | 21.15 |
| 7 | 0.71 | A | 0.09 | G | .15 | 1.03 | 0.63 | 22.85 |
| 8 | 0.71 | B | 0.20 | None | 0.00 | 0.86 | 0.17 | 8.42 |
| 9 | 0.71 | B | 0.20 | F | 0.20 | 1.03 | 0.23 | 11.67 |
| 10 | 0.71 | C | 0.08 | None | 0.00 | 1.16 | 0.89 | 26.80 |
| 11 | 0.71 | C | 0.08 | F | 0.10 | 1.17 | 1.01 | 31.97 |
| 12 | 0.71 | D | 0.20 | None | 0.00 | 1.04 | 0.64 | 24.64 |
| 13 | 0.71 | D | 0.20 | F | 0.15 | 1.10 | 0.79 | 24.51 |

[1]Letters A-D represent phenolic complexing agents.
A methyl gallate
B 1,1'-Spiro bi(5,6,7-trihydroxy-3,3-dimethyl-1,2-dihydroindene)
C 3,4-Dihydroxynaphthalene
D 1,1'-Spiro bi(5,6-dihydroxy-3,3-dimethyl-1,2-dihydroindene)
[2]Letters E-G represent non-complexing phenolic compound.
E Bisphenol A
F 2,6-di-tert-butyl-4-methylphenol (Ionol ®, Shell Chemical Co.)
G 2,2'-methylene bis(6-tert-butyl-4-methylphenol) (Cyanox ® 425, American Cyanamid)

From the foregoing Table, it can be seen that the addition of a non-complexing phenolic compound to a conventional ferric-phenolic thermal imaging system, i.e. ferric stearate-methyl gallate, improves the contrast value, measured at 145° C., and further improves, i.e. increases, the rate of the color forming reaction. This result is clearly demonstrated when the results of runs 2-7 are compared with the result of run 1, i.e. the control.

From the results of runs 8-13, it can be seen that the inclusion of Bisphenol A in each of a variety of ferric-phenolic thermal imaging systems results in improvement in contrast value, measured at 145° C. Runs 8-11 further show that inclusion of Bisphenol A in the ferric-phenolic thermal imaging system results in an increase in the rate of the color forming reaction.

What is claimed is:

1. Heat-sensitive composition comprising:

A. at least two reactants which at normal room temperature do not react with each other, but which, upon application of thermal energy, undergo a chemical reaction with each other which results in change of color, said at least two reactants comprising either (1) a ferric salt of an organic acid and (2) a phenolic compound which forms a complex with the ferric ion of said ferric salt upon application of thermal energy or (1*a*) at least one zinc salt selected from the class consisting of zinc lower alkyl di-substituted di-thiocarbamates, the substituted radicals of which have from one to five carbon atoms, and zinc aryl di-substituted di-thiocarbamates, and (2*a*) at least one heavy metal salt of a higher fatty acid which is non-reactive with said zinc salt at normal room and storage temperature and is reactive therewith at temperatures above the melting point of said zinc salt to produce a color change, and B. a non-complexing phenolic compound wherein said non-complexing phenolic compound does not have hydroxyl groups in adjacent positions on any aromatic ring of a monocyclic or polycyclic aromatic compound.

2. The composition of claim 1 wherein the reactants comprise (a) a ferric salt of an organic acid and (b) a phenolic compound which forms a complex with the ferric ion of said ferric salt upon application of thermal energy.

3. The composition of claim 2 wherein said phenolic compound which forms a complex with the ferric ion of said ferric salt upon application of thermal energy has hydroxyl groups in adjacent positions on any aromatic ring of a monocyclic or polycyclic aromatic compound.

4. The composition of claim 1 wherein the reactants comprise a uniformly dispersed mixture of at least one zinc salt selected from the class consisting of zinc lower alkyl di-substituted di-thiocarbamates, the substituted radicals of which have from one to five carbon atoms, and zinc aryl di-substituted di-thiocarbamates, and at least one heavy metal salt of a higher fatty acid which is non-reactive with said zinc salt at normal room and storage temperature and is reactive therewith at temperatures above the melting point of said zinc salt to produce a color change.

5. The composition of claim 1 wherein the non-complexing phenolic compound is a bisphenol.

6. The composition of claim 5 wherein the non-complexing phenolic compound is 4,4'-isopropylidenediphenol.

* * * * *

UNITED STATES PATENT AND TRADEMARK OFFICE

CERTIFICATE OF CORRECTION

PATENT NO. : 4,631,084

DATED : December 23, 1986

INVENTOR(S) : Burt K. Sagawa

It is certified that error appears in the above-identified patent and that said Letters Patent is hereby corrected as shown below:

Col. 8, line 67, "imaqing" should read --imaging--.

Col. 11, line 2,
after "Temperature (T)", "$D_{max}$" should start a new line

Signed and Sealed this

Tenth Day of March, 1987

Attest:

DONALD J. QUIGG

Attesting Officer

Commissioner of Patents and Trademarks